United States Patent
Fletcher et al.

(10) Patent No.: US 11,138,652 B2
(45) Date of Patent: *Oct. 5, 2021

(54) METHOD AND COMPUTER PROGRAM PRODUCT FOR AN EXPANDED SHOPPING PRODUCT PAGE AND CATALOG LAYOUT

(71) Applicant: EOScart LLC, Providence, RI (US)

(72) Inventors: Sarah R. Fletcher, Providence, RI (US); David J. Sturman, Brookline, MA (US)

(73) Assignee: EOScart LLC, Charlestown, RI (US)

( * ) Notice: Subject to any disclaimer, the term of this patent is extended or adjusted under 35 U.S.C. 154(b) by 211 days.

This patent is subject to a terminal disclaimer.

(21) Appl. No.: 16/579,769

(22) Filed: Sep. 23, 2019

(65) Prior Publication Data

US 2020/0090252 A1   Mar. 19, 2020

Related U.S. Application Data

(63) Continuation of application No. 15/098,925, filed on Apr. 14, 2016, now Pat. No. 10,430,862.

(Continued)

(51) Int. Cl.
*G06Q 30/00* (2012.01)
*G06Q 30/06* (2012.01)

(52) U.S. Cl.
CPC ..... *G06Q 30/0633* (2013.01); *G06Q 30/0635* (2013.01); *G06Q 30/0641* (2013.01); *G06Q 30/0643* (2013.01)

(58) Field of Classification Search
None
See application file for complete search history.

(56) References Cited

U.S. PATENT DOCUMENTS

| | | | |
|---|---|---|---|
| 8,117,089 B2 * | 2/2012 | Minsky | G06Q 30/0643 705/27.1 |
| 8,170,919 B2 * | 5/2012 | Barbour | G06Q 30/0603 705/26.1 |

(Continued)

OTHER PUBLICATIONS

PC connection web site earns 4-star rating from PC world; web site praised for easy checkout, product information, design excellence. (Oct. 15, 2002). Business Wire Retrieved from https://dialog.proquest.com/professional/docview/1055702602?accountid=161862 (Year: 2002).*

(Continued)

*Primary Examiner* — Allison G Wood
*Assistant Examiner* — Ashley D Preston
(74) *Attorney, Agent, or Firm* — Fenwick & West LLP

(57) ABSTRACT

A client device retrieves a retail page listing products for sale by an online retailer. The client device receives a selection of a product from a user and displays extended information about the product in an extended product page near the product. The extended information includes a template with images of the product and advertising copy for the product to provide a compelling, magazine-like view of the product. The user may add the product to a bag that provides a staging area for a group of products prior to purchase. The user may visit additional retailers and add products from those retailers to the bag that provides a unified view of the products from across the various retailers. When a user is ready to purchase the products in the bag, a purchase flow is initiated at each online retailer for the products at that retailer.

18 Claims, 11 Drawing Sheets

Related U.S. Application Data

(60) Provisional application No. 62/147,475, filed on Apr. 14, 2015.

(56) References Cited

U.S. PATENT DOCUMENTS

| | | | |
|---|---|---|---|
| 8,180,690 B2 | 5/2012 | Mayle et al. | |
| 8,190,493 B2 | 5/2012 | Saarinen et al. | |
| 8,583,507 B2 | 11/2013 | Chow et al. | |
| 9,058,695 B2 | 6/2015 | Cardno et al. | |
| 9,081,469 B2 | 7/2015 | Scott | |
| 10,430,862 B2 * | 10/2019 | Fletcher | G06Q 30/0633 |
| 2004/0267613 A1 * | 12/2004 | Chan | G06Q 30/02 705/14.67 |
| 2009/0299875 A1 * | 12/2009 | Zhu | G06Q 30/06 705/26.1 |
| 2014/0019298 A1 | 1/2014 | Suchet et al. | |
| 2015/0120508 A1 | 4/2015 | Black | |

OTHER PUBLICATIONS

Business Wire, "Webinar: ExactTarget and SeeWhy Deliver the Seven Secrets to Recovering Abandoned Shopping Carts," Feb. 9, 2010, four pages [Online] [Retrieved on May 20, 2019] Retrieved from the Internet <URL: https://dialog.proquest.com/professional/docview/1060649108?accountid=161862.>.

United States Office Action, U.S. Appl. No. 15/098,925, filed Sep. 18, 2018, 25 pages.

* cited by examiner

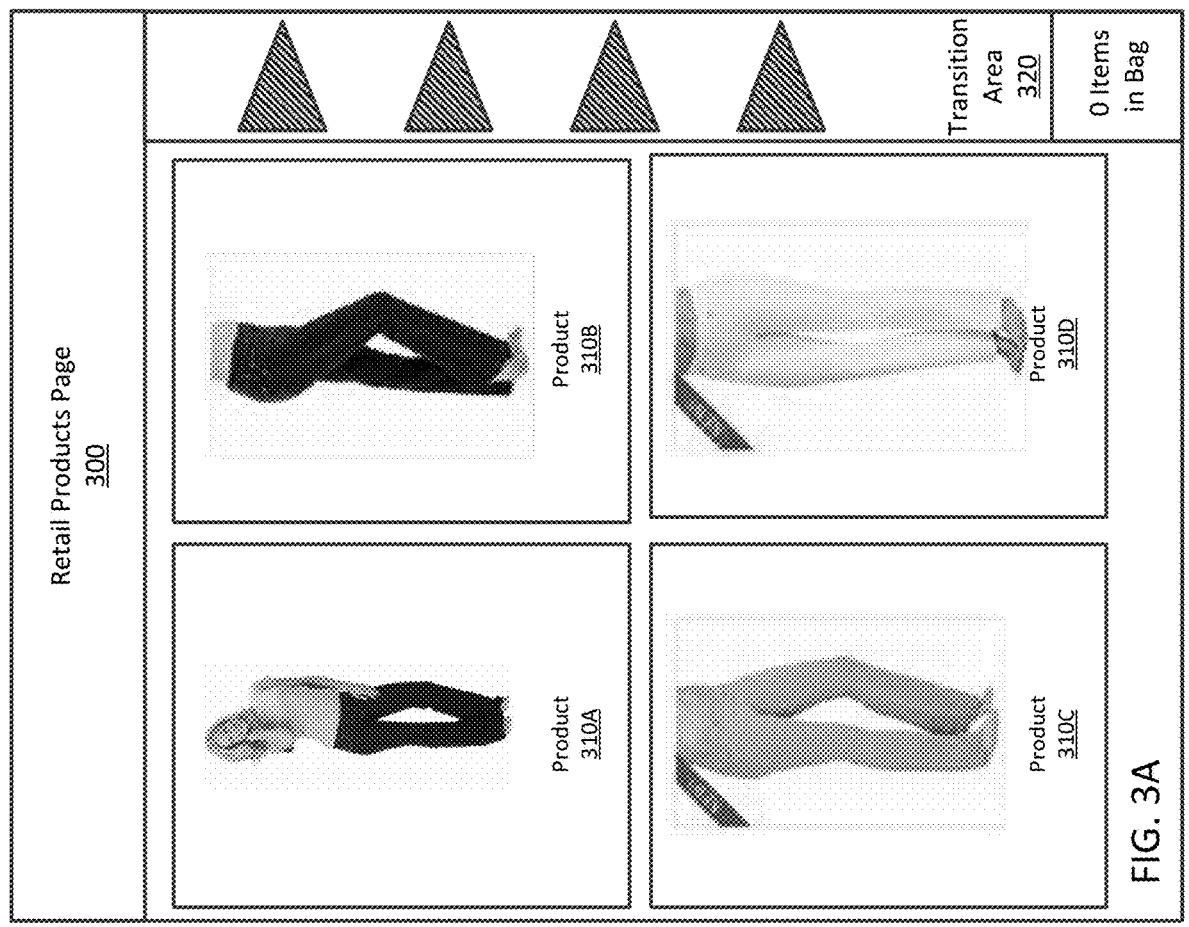

METHOD AND COMPUTER PROGRAM PRODUCT FOR AN EXPANDED SHOPPING PRODUCT PAGE AND CATALOG LAYOUT

CROSS REFERENCE TO RELATED APPLICATIONS

This application is a continuation of U.S. patent application Ser. No. 15/098,925, filed Apr. 14, 2016, which claims the benefit of U.S. Provisional Application No. 62/147,475, filed Apr. 14, 2015, which is incorporated by reference in their entirety.

BACKGROUND

This invention relates generally to online shopping, and more particularly to providing improved display and management of products.

Online shopping doesn't convert shoppers to customers as well as other forms of direct marketing. Currently e-commerce is designed primarily to get shopping done quickly but it isn't as engaging, entertaining or as pretty as a good catalog, or retail shopping experience.

Current shopping carts found on e-commerce sites are not really part of the shopping experience and instead are the checkout at the end of the shopping experience. Another problem is that in e-commerce the checkout images are too small to see what is in the cart easily without having to click to the item's detail page and back. It isn't easy to change colors or sizes without going back to the item's detail page. Current carts also don't allow customers to see how items would look together and may make it difficult to select coordinating items. For clothing in particular, this makes it difficult to select a coordinated outfit, particularly choosing items from more than one retailer.

Online shopping doesn't have the rich branding and visual impact of a paper catalog. So even retailers who have a selection of beautiful images can't effectively and easily show them to customers while they shop. This branding and selection of images may be crucial to translating browsing users into converted purchasers. Especially for high-end retailers, this branding may differentiate their products and the right images can increase sales significantly.

Another frustration shoppers have is that the actual online shopping experience isn't fluid and clicking back and forth between items is jarring and often difficult, particularly on a mobile device. Additionally, e-commerce is typically limited to a single retailer at a time and it is difficult to compare and combine items from different retailers while determining which items to purchase.

Mobile conversion rates are also a problem for mobile commerce and a major roadblock to expansion of the mobile market. Because of the small screen size shopping on mobile devices is difficult. Shopping on mobile devices is even harder for those with large fingers or poor coordination. The small screen size limits the size of the checkout thumbnails, which further diminishes the shopping experience and makes it harder to shop on a phone.

Altering the checkout of an e-commerce system is a difficult task and involves security risks as well as inventory management problems and potentially massive overhauls. Any solution to the previously stated problems that involved the checkout would be better received in the marketplace if it leaves the existing checkout untouched.

BRIEF DESCRIPTION OF THE DRAWINGS

FIGS. 3A-3F illustrate various user interfaces for displaying products, expanded product pages, and bag pages according to some embodiments.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
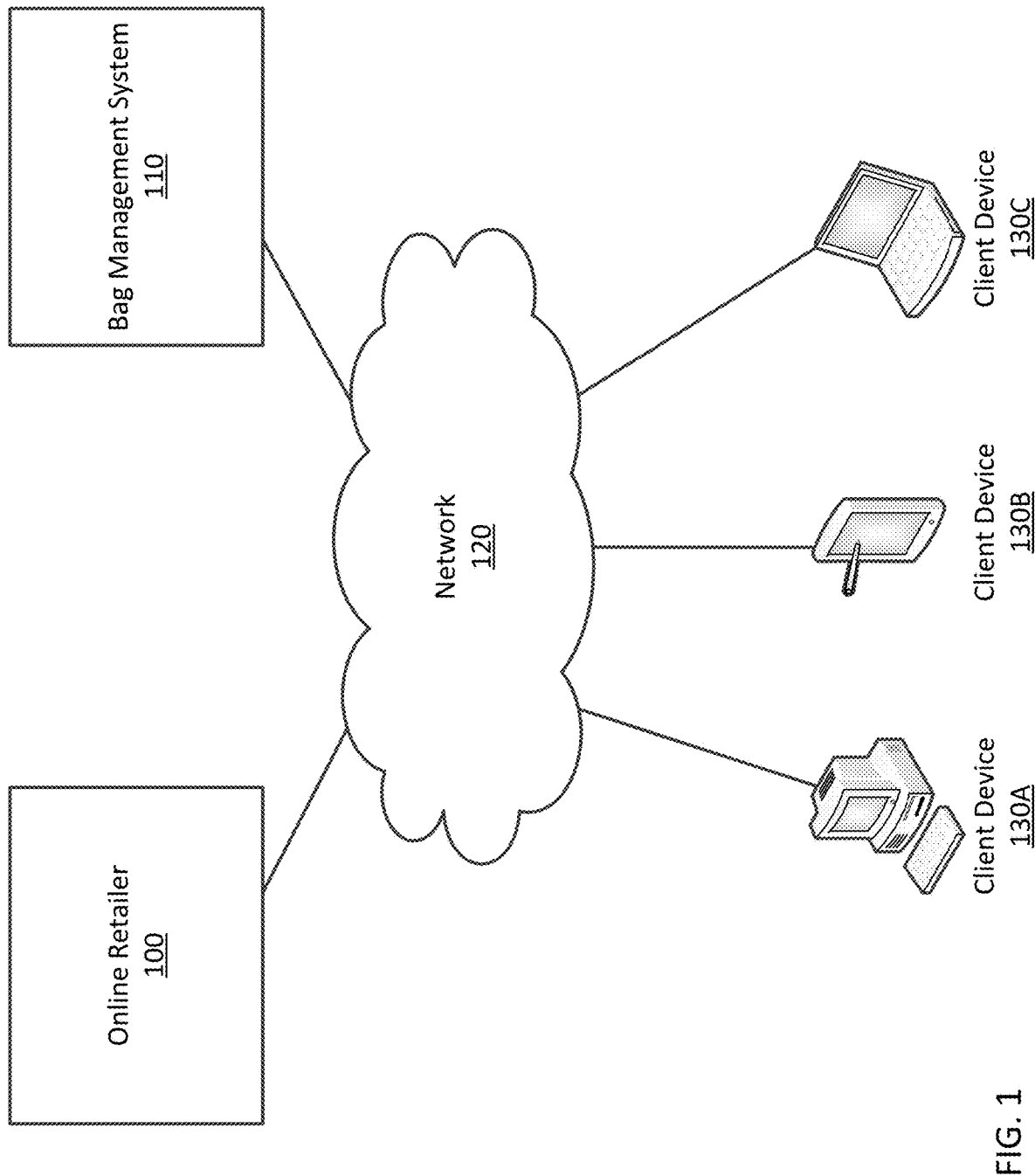
FIG. 1 shows an environment for a bag management system that improves an online shopping experience for a user, according to one embodiment.

FIG. 1 shows an environment for a bag management system that improves an online shopping experience for a user, according to one embodiment. As shown in FIG. 1, an online shopping environment may include a variety of types of user devices 130 whose users may browse and purchase products at online retailer 100 with the user device 130. As the user browses at the online retailer 100, the user views products provided by the online retailer 100. When a user selects a product, the client device 130 provides an additional interface to the online retailer's product page to display expanded product information in an expanded product page. The expanded product page may be adjacent to the retail products page, or may be an overlay on top of the retail products page. The expanded products page provides images, video, or other product representations and advertising copy to a user and permits easy review of more detailed product information. From the expanded products page, the user may add the product to a bag maintained by the bag management system 110. When the item is added to the bag, the products in the bag are displayed in a bag view, permitting the user to see the various items in the bag together and with a primary image of the product. From the bag page, the user may also adjust which configuration of the product is purchased, for example to adjust size, color, and other features of the product. As the user browses at multiple online retailers, the bag page may maintain products from different online retailers 100. The user may also view the expanded products page for a product from the bag page by selecting a product in the bag page. In addition, a user may select an option to checkout via the bag page. When the user elects to check out, the bag management system 110 provides instructions to the client device for purchasing the products in the bag from each online retailer 100, for example by providing instructions to the client device identifying the items in the bag for each retailer and initiating a payment process at each online retailer for the retailer's items. This permits a user to easily view product details that are presented in a more desirable way and shop at many online retailers simultaneously, as well as modify purchases from multiple online retailers via the bag page. This may also improve the display of products to a user, permitting the device to more effectively communicate product and bag details relative to traditional cart and checkout processes.

The online retailer 100 may provide a list or catalog of products for a user to purchase. Though a single online retailer 100 is shown here, in practice many online retailers 100 may offer products to users of the client device 130, and the various online retailers may each have products displayed by an expanded product page and in a bag page for the user. The online retailer 100 also provides various product details to the bag management system 110 for display to the user. For example, the online retailer 100 may maintain an API that may be accessed by the bag management system 110 to automatically retrieve expanded product information and configuration options for a product. Each online retailer 100 may also maintain a separate purchase process for users to purchase products at the online retailer 100. The online retailer 100 may initiate a purchase process based on a set of products selected by a user, or from an indication received from the client device 130 designating products to purchase and a configuration of those products.

The client device 130 may be various types of computing devices permitting a user to browse products at the online retailer 100. Example client devices 130A-130C show a desktop, laptop, and handheld computing device. The client device 130 accesses products at the online retailer 100 via a browser operating on the client device and provides a display of the products to a user of the device. When a user accesses the online retailer 100, the online retailer 100 may provide a link or other code to the client device 130 directing the client device 130 to access the bag management system 110 to provide a transition area on the retailer page permitting the client device 130 to display expanded product details. When the client device 130 accesses the bag management system 110, the bag management system provides mark-up language or code for displaying the transition area and interacting with the bag management system 110. The code may be JavaScript or another language for execution in or as an extension to the browser at client device 130. As discussed further below, when a user interacts with the transition area, the client device 130 displays an expanded product page for the user, including expanded product details. Rather than following a link from the online retailer 100, in some examples the client device 130 operates a plug-in or separate application that provides similar functionality to the browser when accessing the online retailer 100. The operation of the product extension page and related bag page are further discussed below.

Network 120 provides a communication channel between the client device 130 and online retailers 100 and bag management system 110. The network 120 may be any suitable network having wired and wireless components that connect these computing systems, and may use routing such as IPv4 and IPv6 to route communication.

The bag management system 110 provides expanded product information and bag management for users accessing online retailer 100. When client device initially accesses the bag management system 110, the bag management system provides the code or other mark-up language for the browser to further interact with the bag management system 110.

In some embodiments, the functionality of bag management system 110 is incorporated into the online retailer 100 (though it may provide services to other online retailers), while in other embodiments the bag management system 110 is a separate system from the online retailer 100 as shown in FIG. 1.

In the environment of FIG. 1, various conventional components may also be included, such as failover services, firewalls, various networking devices, and so forth. These components are not included to simplify the presentation of the environment shown in FIG. 1.

Figure 2:
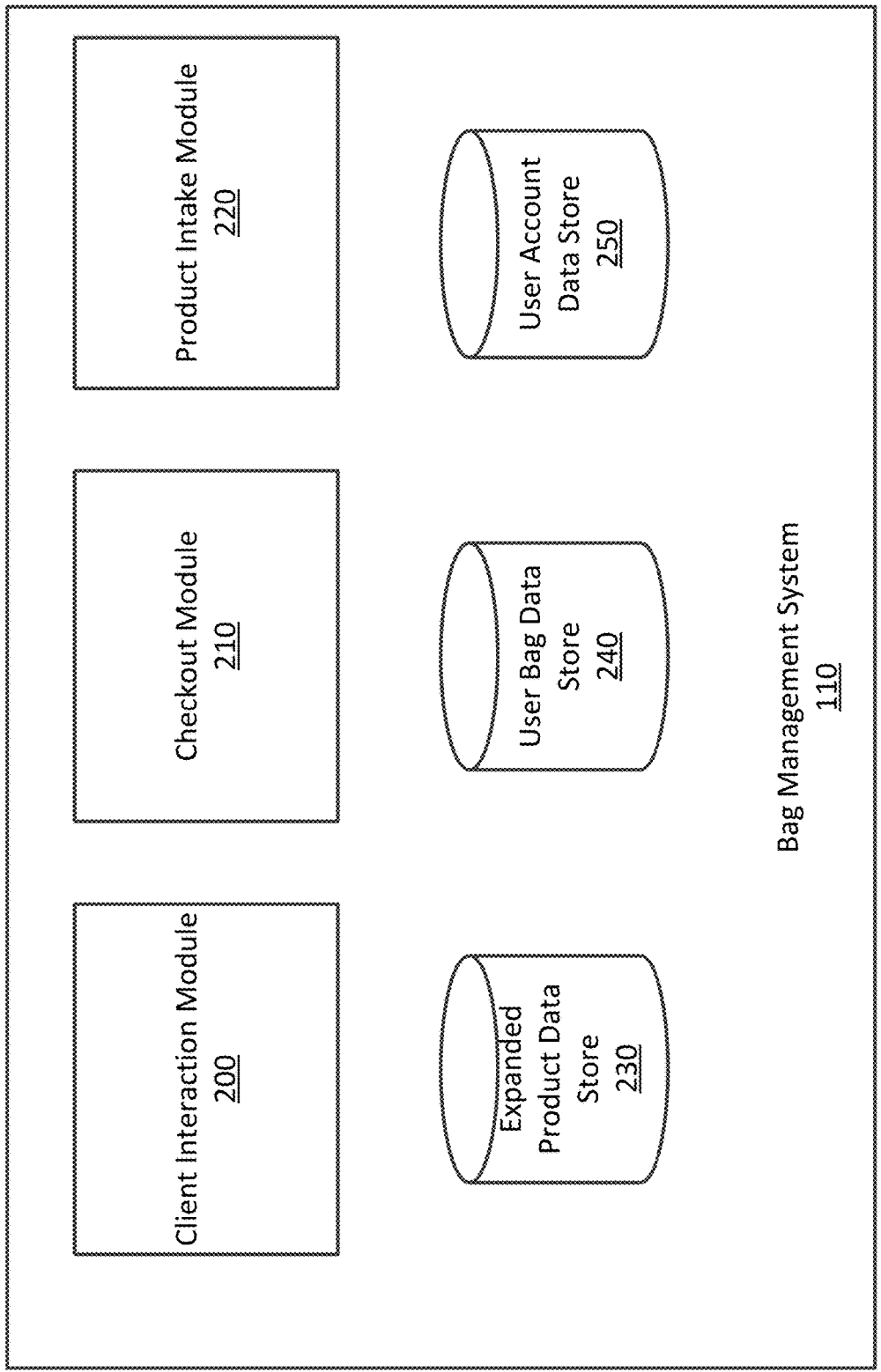
FIG. 2 shows additional components of an example bag management system.

FIG. 2 shows additional components of an example bag management system 110. In this example, the bag management system includes a client interaction module 200, a checkout module 210, and a product intake module 220, as well as data stores including an expanded product data store 230, a user bag data store 240, and a user account store 250.

The client interaction module 200 receives requests from client devices 130 and provides responses from the bag management system 110 to the requests, and is one means for doing so. For example, the client interaction module 200 may receive initial GET requests from the client device 130 and provide the related code and markup language in response. When the client device 130 accesses an expanded product page, the client interaction module 200 may receive a product identifier of the product selected by the user, and retrieve related information in the expanded product data store 230 for the product identifier. In addition, the client interaction module 200 may manage a cookie or other storage on the client device for maintaining information related to the bag management system 110. The cookie may include recent products viewed by the client device 130, or may include a copy of the user bag data, which in some examples is not maintained at the user bag data store 240. To request or update the bag or product data, the client device 130 sends, and the bag management system receives, a request via an API, such as a request to an endpoint for a JavaScript function call. The user may also create a personal account in the bag management system 110. The user can use their account credentials to access, save, and review one or more bags associated with an account at the user account data store 250. By logging in with the account, users' bags may be associated with more than one client device 130. When users browse in the different client devices 130 or in different browsing sessions, users can manipulate the contents of the bag to modify, add, delete, visually rearrange, purchase, or perform other actions on the products in the bag which are stored in user bag data store 240 and associated with the user in the user account data store 250. Users may access their personal bags through the bag management system's extension of an online retailer's website, or through an independent bag management system website.

The expanded product data store 230 maintains data relating to the display of products for an expanded product page, and is one means for doing so. The expanded product information provides a presentation for the product to a user in the expanded product page. The presentation may resemble a product presentation in a product catalog or a print magazine advertisement. The expanded product information may include various information about the product, such as its name, price, and a template for presenting advertising copy and images of the product to a user. The expanded product data store 230 may maintain the related images, or include a reference to the images stored at another location, such as the online retailer 100. Thus, the expanded product information provides information for display to the user to provide additional information about a product in an organized way that can present a compelling view of the product to the user. The expanded product information may also include various configuration options, such as size, color, and other configurations for the products. In addition, the product information may also include a quantity of the products (e.g., in each configuration) available at an online retailer. The product information may further include additional information such as available coupons, shipping costs, gift wrapping/add on options, related products, and so forth.

Figure 4:
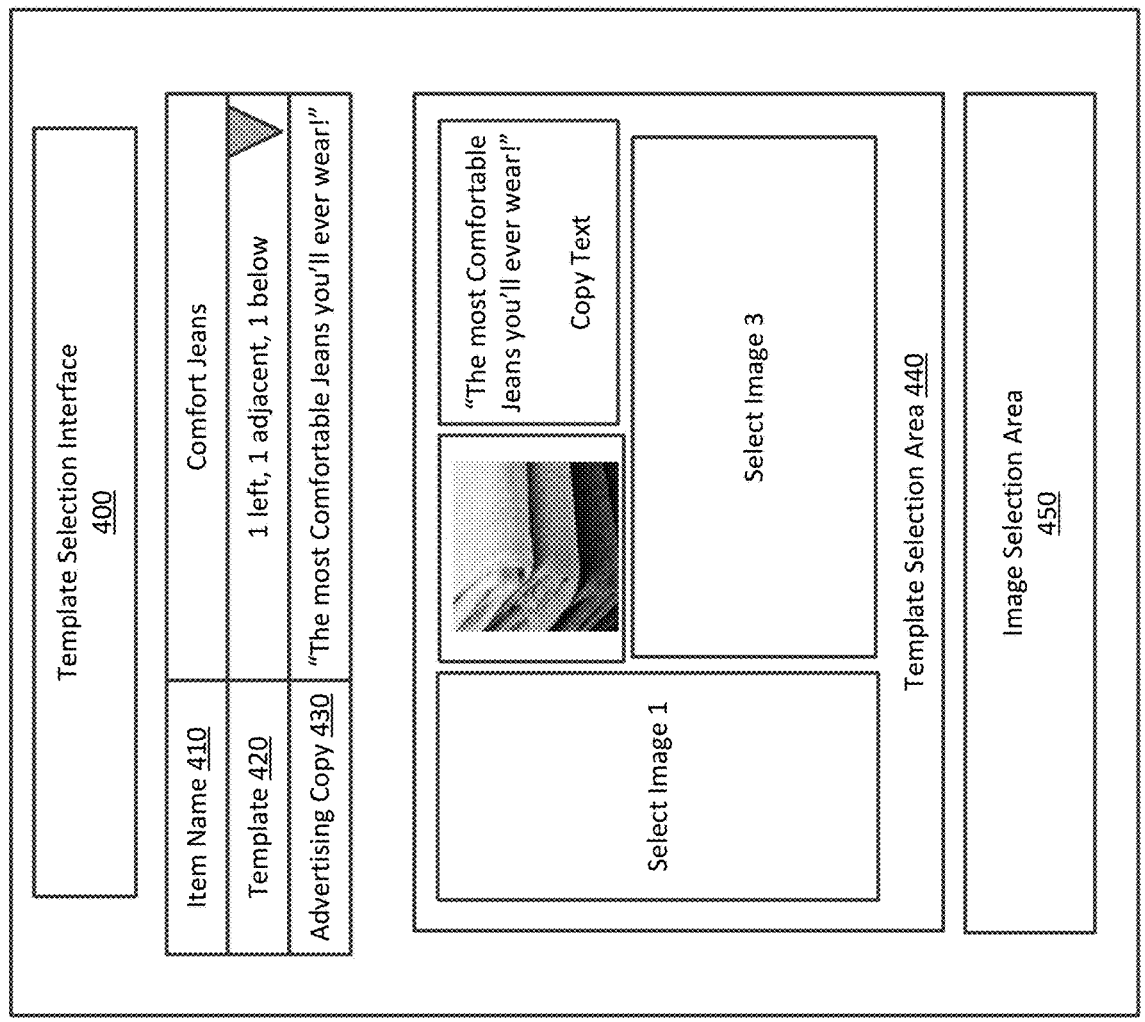
FIG. 4 illustrates a template selection interface 400 for a product according to one embodiment.

The product intake module 220 maintains and updates the data in the expanded product data store 230. As shown in FIG. 4, the data for the templates and other selected content for a product may be added or modified by an operator at the online retailer 100. In other examples, the product intake module 220 automatically retrieves and updates product information from the online retailer 100, for example via an API at the retailer's inventory management system. The online retailer 100 may designate in its inventory system a set of desired images, videos, or other product representations and templates and other information for the display of the expanded product information.

As the user interacts with products in the expanded product information, the user may also designate the addition of a product to a bag. The bag provides a grouping of items for display to a user that may later be used for purchase by the user, and typically are not yet a part of a purchase process at the online retailer 100. When the user selects an item for the bag, the client interaction module 200 adds the product to a bag associated with the client device 130 in the user bag data store 240. As indicated above, in some embodiments a bag is maintained locally at the client device 130 in addition to or as an alternative to the user bag data store 240. In some examples, the user may locally add products to the bag without notifying the bag management system, or by only notifying the bag management system 110 occasionally.

When a user elects to checkout and purchase one or more products from the bag, the checkout module 210 provides instructions to the client device for effectuating the purchase of the products. For example, the checkout module 210 may identify the group or set of products for each online retailer associated with the user's bag. Instructions may be provided to the client device 130 to add the group to a purchase process at the respective online retailer 100. This may include, for example, providing a product identifier or particularly-configured request to each online retailer 100 to add the products to a cart at the online retailer and initiate a purchase process. In other embodiments, the bag management system 110 may provide a purchase process itself and permits purchase from the various online retailers through the bag management system 110.

To provide purchasing from the bag management system 110, the bag management system 110 may query the online retailers for the cost of selling, shipping, taxes, and other expenses related to the sale. The bag management system 110 may consolidate such expenses from more than one online retailer for the selected products and provide a consolidated purchase process. After completing the purchase, each online retailer 110 may be notified to ship items for the purchase.

Figure 3B:
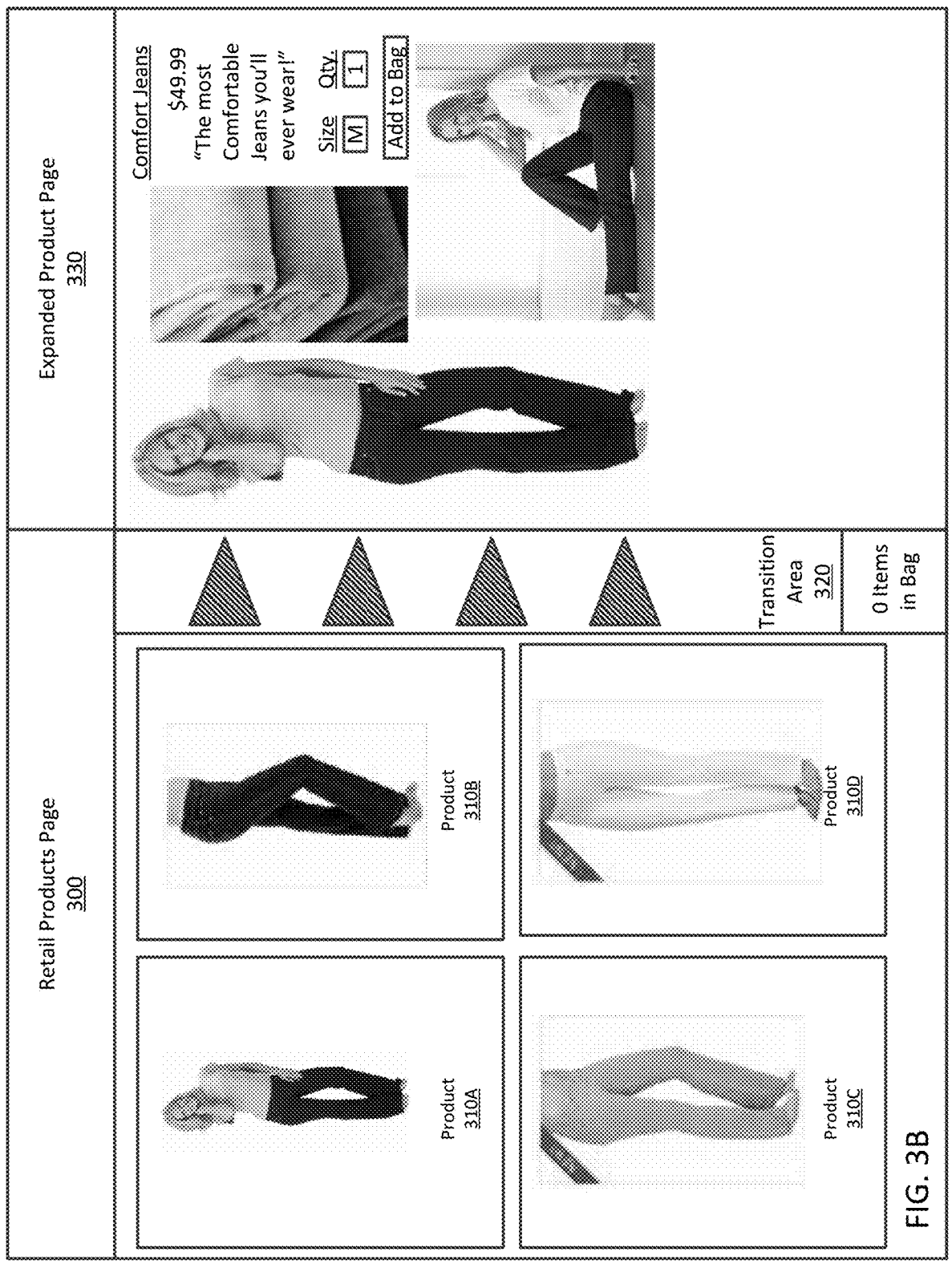

FIGS. 3A-3F illustrate various user interfaces for displaying products, expanded product pages, and bag pages according to some embodiments. FIGS. 3A-3E illustrate sequential modifications of the user interface as a user views additional information on a product and adds products to a bag. FIG. 3A illustrates a retail products page 300 retrieved from an online retailer 100. The retail products page 300 includes a variety of products 310. In this example, a few products are shown by an image of the product, though the products 310 may also have a short description and other information about the products as provided by the online retailer.

When the client device 130 loads the retail products page 300, the client device also receives a reference to the bag management system 110, which provides code or markup language (e.g., JavaScript or HTML) for generating a transition area 320. The transition area 320 may also provide an indication of the number of products in a bag associated with the user. In this example, the transition area 320 is also visually distinguished from the main retail products page.

The user may interact with the transition area 320 to open a bag page or to view expanded product details for a product displayed on the retail products page 300. To view expanded product details for a product 310, the user may select and drag an image of the product to the transition area 320. Alternatively, the user may select the product 310 and provide a touch or other input gesture (e.g., a mouse movement) towards the transition area to provide the expanded product details. In another example, when the transition area 320 is interacted with and the user has not selected a product 310, the bag page may be displayed to the user.

FIG. 3B shows an example interface after a user has selected product 310A and moved the product 310A to the transition area 320. When the produce is selected, the client device 130 (e.g., through the JavaScript code) identifies a product identifier associated with the product and requests the expanded product details from the bag management system 110. The online retailer may provide a unique identifier for each product displayed in the retail products page 300 to distinguish products from one another, which may match the product identifiers stored by the bag management system 110. In another example, when the products are retrieved from the online retailer 100, the expanded product information may be prefetched for each of the products to speed loading time when a user selects a product.

The expanded product information is shown in the expanded product page 330. In this example, the window or other portion of the user interface initially displaying the retail products page 300 is expanded to display the expanded products page 330 in addition to the retail products page 300. The user may then also select a different product 310 in which case the expanded product page displays the expanded product information for the different product. In this way, a user may quickly view additional product information for different products easily. The expanded product page 330 displays the expanded product information using the template and images, video, or other product representations associated with the product at the bag management system 110. In this example, a pair of jeans is displayed with several images selected for the jeans based on the template. The template in this case specifies a set of images including a tall image to the left of the product description and product copy, as well as two smaller images that are adjacent to and below the product copy. The number of and arrangement of the images, as well as the specific images are provided with the template for display in the expanded product page 330. These images may be laid out and displayed as selected by the online retailer and thereby provide a compelling display of the product more similar to a catalog or other visual display than other product displays, such as those in the retail products page 300. The expanded product page 330 may also include a set of configuration options for the product. In this example, the configuration options include a size, though in other examples a color, fit, and other features of the product may be customized based on the specific product. As the user updates the configuration options, different images may be selected for the product according to the template and the selected images of the expanded product information. For example, when a user selects a different color of clothing, a template with images of the different colors may be selected. In some examples, the template differs between configurations to provide different views of the different configurations.

Figure 3C:
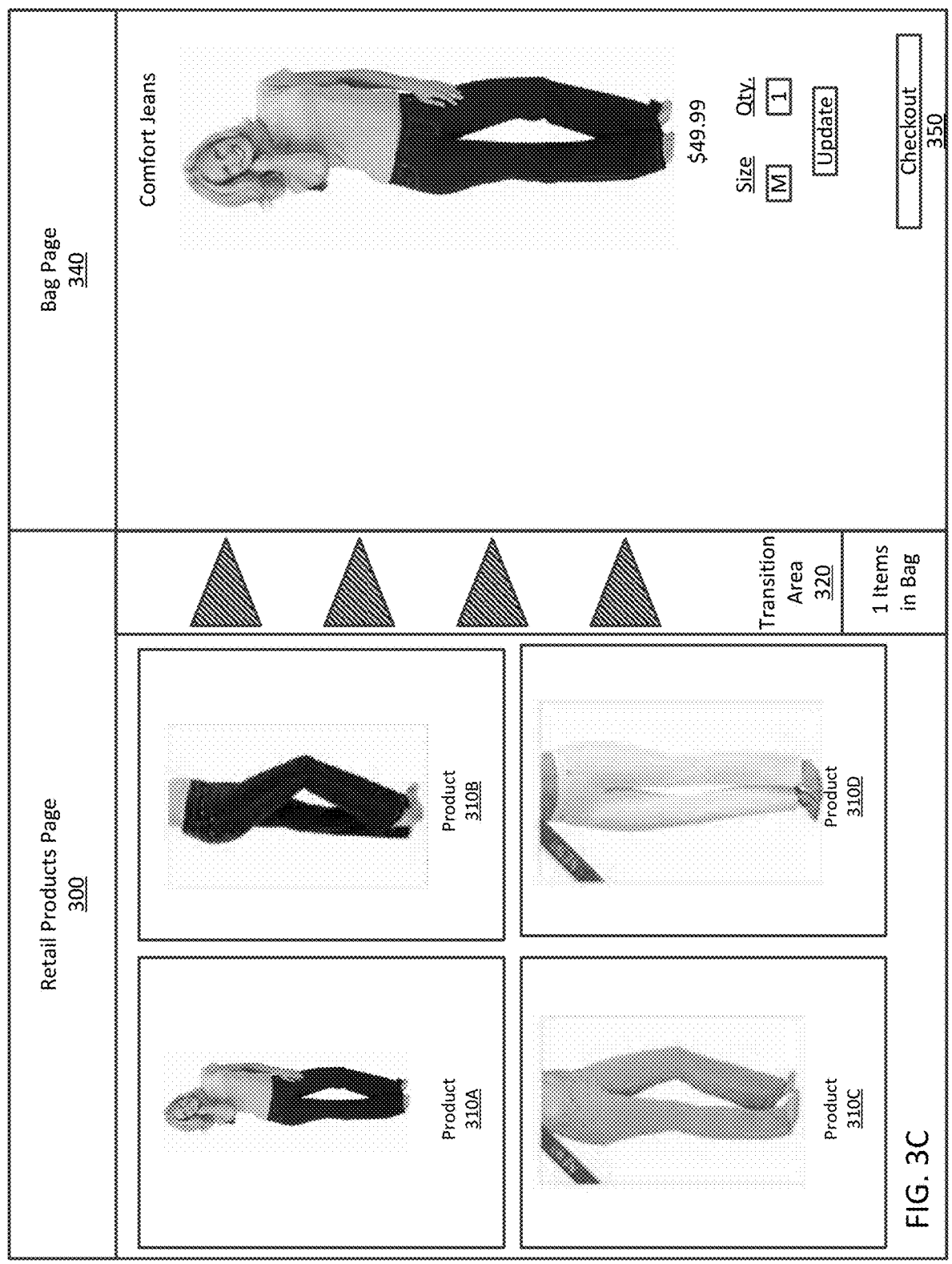
Figure 3D:
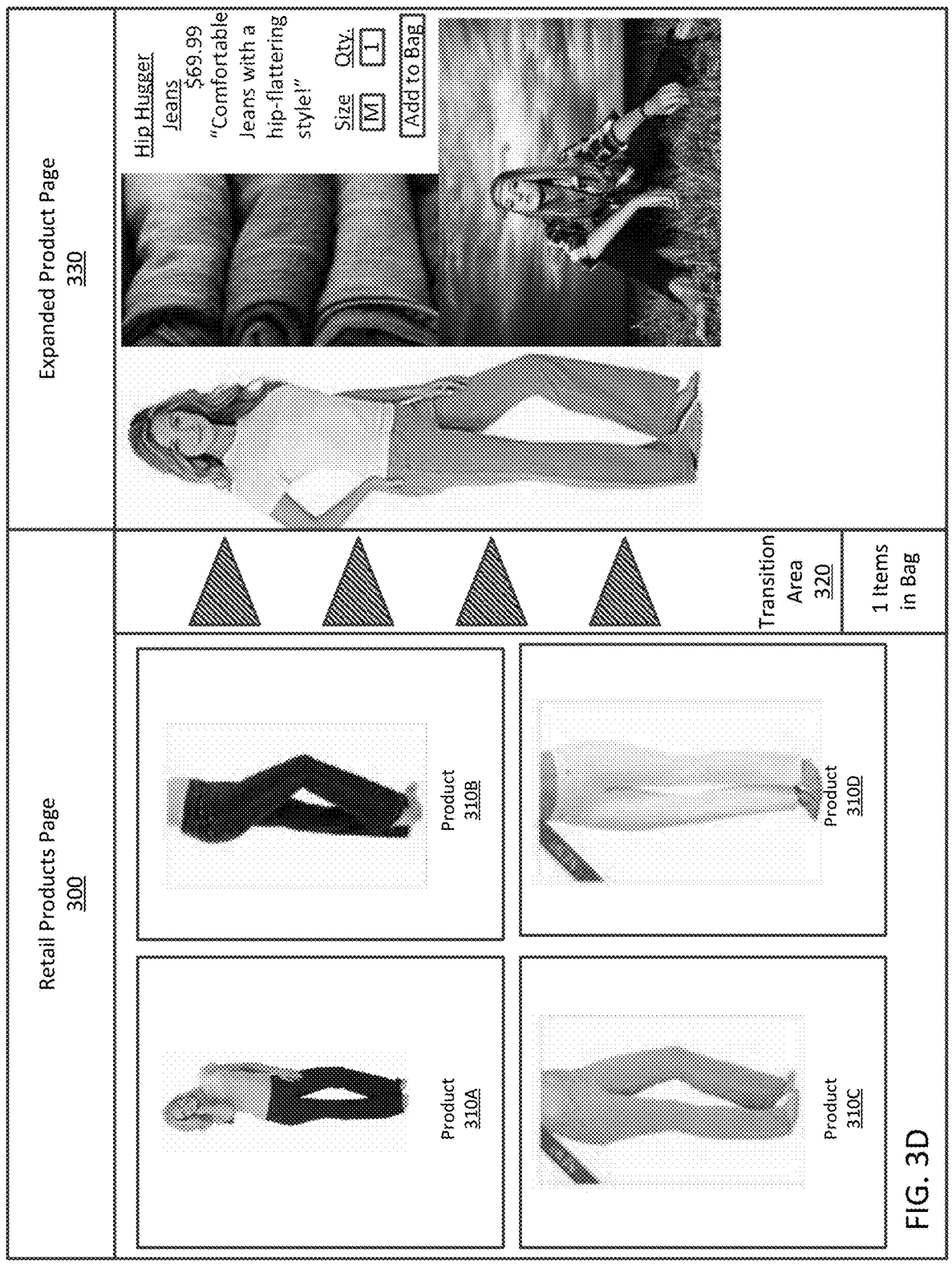

In addition, a user may select a quantity of the product and add the product to a bag using a user interface element for this operation. After selection of the product, a bag page may be displayed to the user rather than the expanded product page 330. An example bag page is shown in FIG. 3C. In this example, the bag page displays the objects in the bag for a user. In this case, the bag is a collection of products that the user may view together in the bag page 340, and which the user may be considering for purchase. When the bag page is displayed, the user may select an additional product from the retail products page 300. When the user selects the product, the user may move the product image to the transition area 320 or to the bag page 340. The product may be automatically added to the bag, or an expanded product page may be shown for the selected product. For example, when a user selects product 310C, an expanded product page for product 310C is shown in FIG. 3D. When this product is added to the bag, the bag page 340 is redisplayed and updated with product 310C, as shown in FIG. 3E.

Figure 3E:
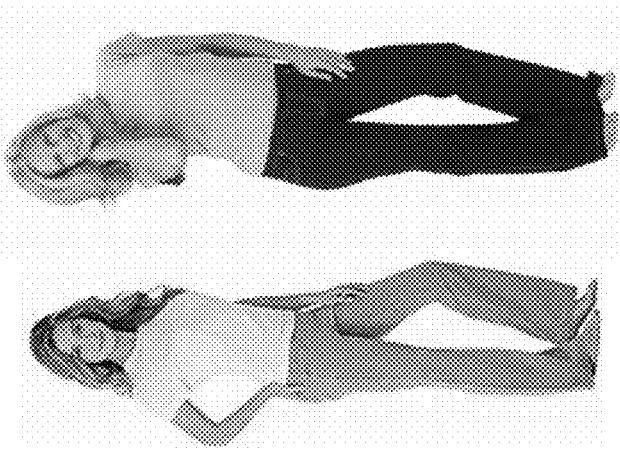

As shown in FIG. 3E, the bag page 340 can provide an image of each of the products in the bag. The bag page 340 may also include a slider if the quantity of products exceeds the available space for the bag page 340. A user may include products in a bag at one online retailer 100 and then visit another online retailer. The bag contents are maintained across online retailers 100. The products in the bag page 340 may be populated from each of the online retailers, and permit the bag page 340 to provide a location for the user to view many different products at the same time and from many online retailers. When a user interacts with a product on the bag page 340, the expanded product page for that product may be displayed (or redisplayed) to the user for the user to review the product in more detail. The bag page 340 may also provide options for the user to adjust configuration options and quantity for the product, as shown.

In addition, when a user is satisfied with the bag products, the user may select a checkout user interface element 350 to begin purchasing the products. A subtotal may also be displayed with the checkout, reflecting the price to purchase the products from the associated online retailers. Thus, this may also provide a consolidated view of the purchase price of the products from the different retailers, and depending on the retailers, the client device 130 may retrieve actual price to ship from the different online retailers 100. As another example, the bag page 340 may separate price information and products in the bag page 340 according to the online retailer offering the product, and the user may purchase at specific online retailers 100 using a checkout user interface element 350 for each online retailer. In other options, a single checkout element provides for purchasing at each online retailer. Purchase may be initiated at each online retailer 100 sequentially, or a set of windows may be opened on the browser for each online retailer.

Figure 3F:
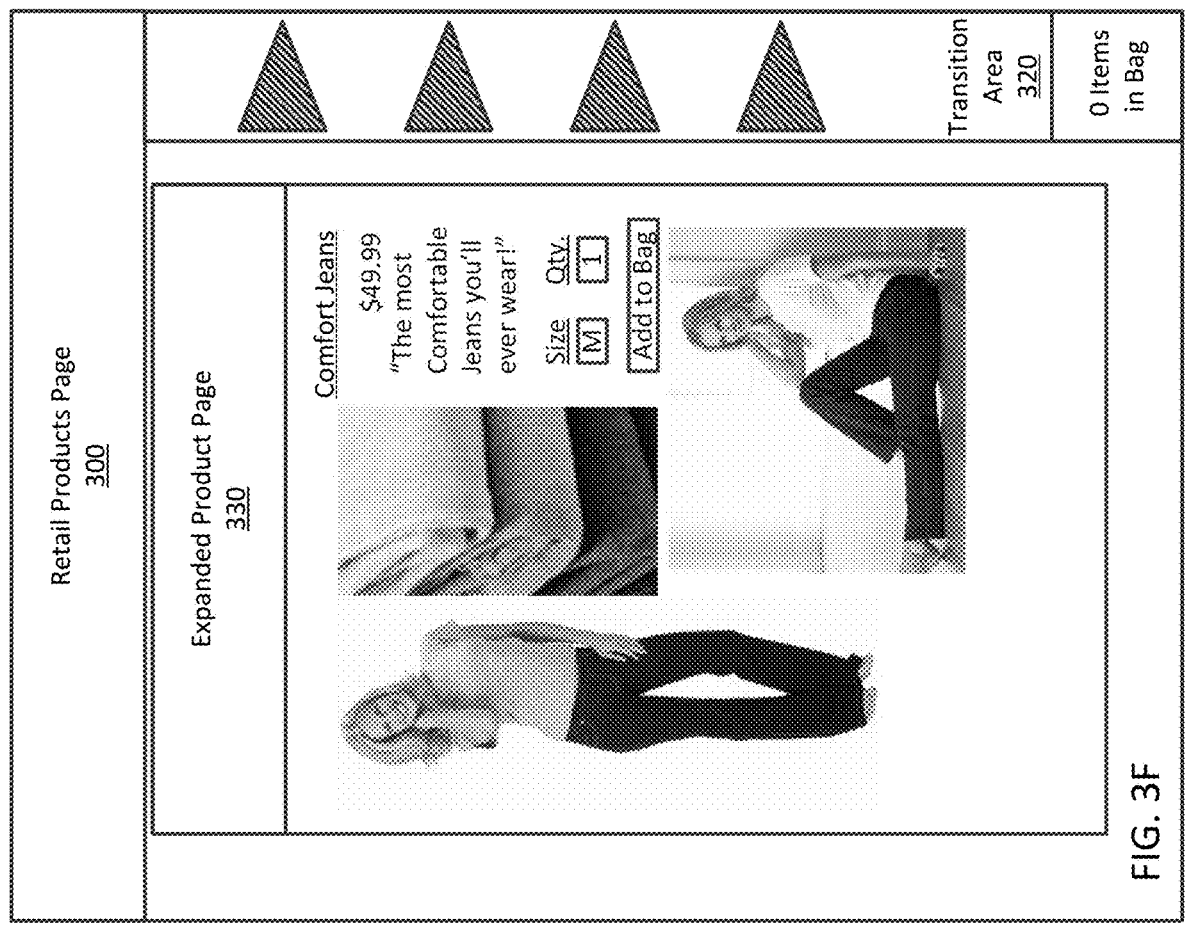

FIG. 3F illustrates an example of an expanded product page 330 as an overlay of the retail products page 300, rather than as an extension of the products page. This may be used, for example, when the client device has limited display area, such as on a smartphone or a tablet device. In this example, the user may use the transition area 320 to add and remove the expanded product page 330 as an overlay on the retail products page 300. In a similar manner, the bag page 340 may also be added as an overlay to the retail products page 300 and permit similar interactions as those describe with respect to FIGS. 3C and 3E.

FIG. 4 illustrates a template selection interface 400 for a product according to one embodiment. The template selection interface 400 is used for an operator of the online system to create and modify the template and images for the product to be displayed in the expanded product page 330. The template selection interface 400 includes various interface elements for the operator to modify the expanded product information. For example, the operator may modify the item name 410, select a template 420, and provide advertising copy 430. The template selected by the operator indicates the number and arrangement of images, video, or other product representations in the template, in this example to use three images, with one tall image to the left, and another image adjacent to the advertising copy and another below the advertising copy. A drop-down interface element provides an option for the operator to select other templates for the product. Though images are shown in this example template, in other examples other types of product representations may also be selected for the templates, such as additional product descriptions (i.e., advertising copy) or videos may be included in different template types.

A template selection area 440 displays an example of the template to the operator of the online system. The template selection area 440 may display the location of images and any advertising copy within the template that will be displayed with the expanded product information. In this example, the template selection area 440 shows the three images locations related to the "1 left, 1 adjacent, 1 below" template 420 that was selected. In this example, an image has already been selected for the "adjacent" image.

To select images, the template selection interface 400 also includes an image selection area 450. The image selection area 450 displays possible images for selection and use in the template, for example to the image locations of the template displayed in the template selection area 440. The images of the image selection area 450 may be retrieved from a folder or other file location designated by the online retailer 100. To select an image for an image location, the operator may select one of the images in the image selection area 450, and optionally drag an image to the location of an image in the template selection area 440. In other embodiments, the operator may select an image for the images in the template selection area 440 by other means. When an image is in a location in the template selection area 440, the operator may also move the image to another of the image locations or swap images at different locations in the template.

Additional information may also be added via the template selection interface 400, for example additional configuration options for the product. The operator may also identify which configuration options or combination of configuration options require a different template or set of images. For example, to designate that "color" has a separate set of images for the template. By using the templates, designers can select and provide images easily for products being displayed to users in a consistent way, and use the template selection interface 400 to preview the appearance of the product in the expanded product page. The designer may also select an image as the primary image for the product, which can represent the product when shown in the bag page 340.

Figure 5:
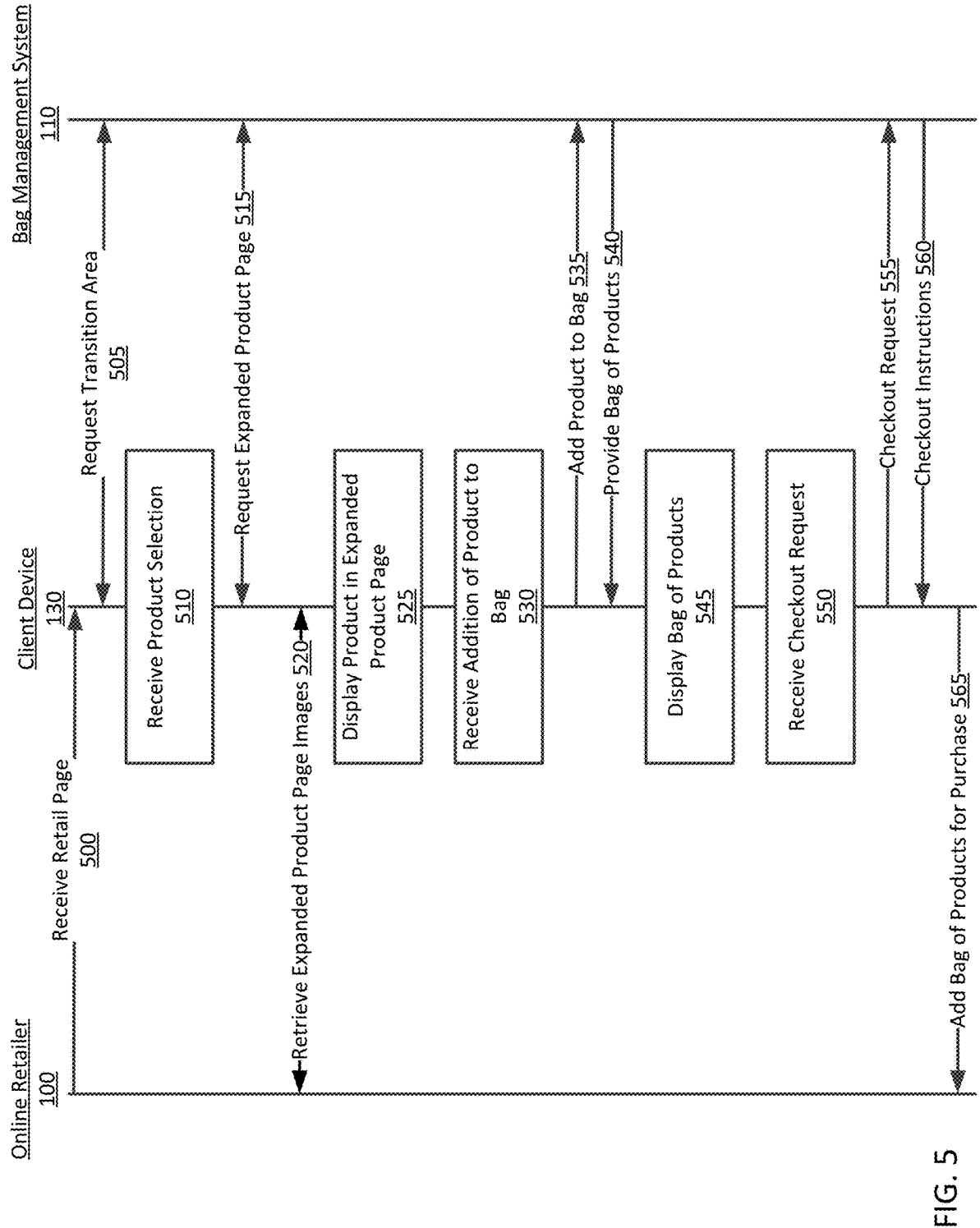
FIG. 5 illustrates an interaction diagram for providing an expanded product page and bag management by a bag management system, according to one embodiment.

FIG. 5 illustrates an interaction diagram for providing an expanded product page and bag management by a bag management system, according to one embodiment.

As shown by FIG. 5, initially a client device 130 accesses an online retailer 100 and retrieves 500 a retail page for display on the client device 130. The retrieved page includes a reference to the bag management system 110, which the client device 130 follows to request 505 the code or markup language relating to the transition area. In one alternative, the client device instead loads the code from memory or from a plug-in invoked by the retail page.

The retail page is displayed to the user with the transition area, and the client device 130 receives 510 a product selection from the user for providing an expanded product page. The code or markup language identifies the product and provides the product identifier to the bag management system 110 to request the template for the expanded product page 515. The expanded product page may include the template and a reference to images stored at the online retailer 100. The client device 130 retrieves 520 the images and any other data from the online retailer 100 by following the reference. In other examples the data, such as images, may be located at another system, such as at the bag management system 110 or at a content distribution network or other data manager. The client device 130 assembles the extended product page using the template and retrieved images and displays 525 the product in the expanded product page.

As the user reviews the product, the client device 130 may receive an addition 530 of the product to the bag. The client device 130 may then notify the bag management system 110 that the product was added to the bag, and receive the complete bag of products 540 from the bag management system if the client device 130 did not already maintain the bag of products. The bag of products may be stored at the client device, for example in a cookie associated with the bag management system or the online retailer 100. The bag of products may also include the templates and related references to images for the various products in the bag, along with the online retailers to which the products relate. The bag of products is displayed 545 to the user on the client device 130. The bag of products may also include products other than those of the retail page on which the user is currently visiting. In this case, the additional products may also be displayed in the bag page for the user to view products of interest from across several sites in a single location.

When a user requests to checkout 550 or purchase the bag, the client device 130 provides 550 a checkout request to the bag management system 110. The bag management system may determine a set of checkout instructions 560 for each of the online retailers that have a product in the bag, for example to configure a request to each online retailer 100 for the client device to send that initiates a purchase process at the online retailer 100 for the products of that retailer. After receiving the checkout instructions 560, the client device 130 provides the instructions to the online retailer 100 to add 565 the products to a purchase request, and the user may complete a purchase with the online retailer 100. In an alternate embodiment, the user completes the purchase through the bag management system 110. The bag management system 110 may execute the purchase request with the online retailer 100 directly using financial and other information the user provides to the bag management system, such as at the time of purchase or as previously stored with the user's account in the bag management system.

Figure 6:
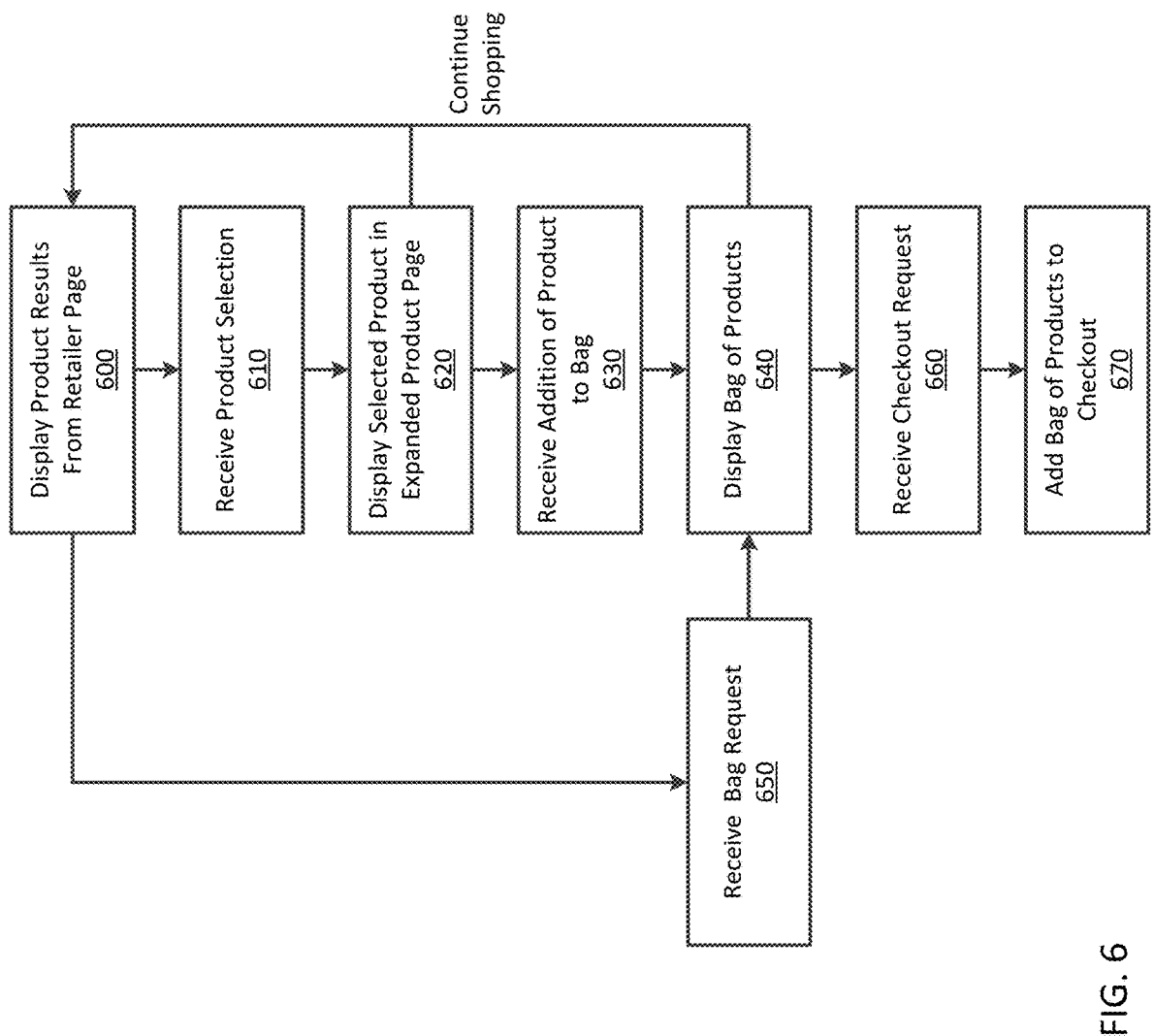
FIG. 6 illustrates an example method for providing managing a user shopping experience according to one embodiment.

FIG. 6 illustrates an example method for providing managing a user shopping experience according to one embodiment. This method may be performed, for example, by a client device operated by a user. Initially, the user may access a retailer page, and the client device displays 600 products on the retailer page to the user. The client device receives 610 a product selection from the retailer page as described above, which may include moving or dragging an image of the product to a transition area of the page. After receiving the product selection, the client device displays the selected product in an expanded product page 620, which may include retrieving a template and related images as described above. From the extended product page, the user may elect to continue shopping and return to the retailer page. For example, when the user is on a mobile device, the extended product page may overlay the retail page and be removed for the user to continue viewing products on the retail page. The user may instead select the product to add 630 to the bag of products, in which case the bag page may be displayed 640. From the bag page, the user may modify products, such as by modifying configurations of the product or the quantity. The user also may continue shopping at the retailer page to consider additional products to add. The user may also visit the page of another retailer, and add products to the bag from the other retailer's page. From the retailer page, the user may also directly request to view the bag, which is received 650 by the client device and the bag page is displayed 640. The client device 130 may receive 660 a request to checkout indicating the user's desire to purchase one or more of the displayed products, at which point the selected products in the bag are identified to the retailer for purchase and the user may enter a purchase flow at each online retailer for those products relating to that online retailer. Alternatively, the purchase flow may be performed with the bag management system 110 in embodiments where the bag management system provides purchase services in conjunction with one or more online retailers, for example to provide a consolidated purchase process as discussed above. The bag management system 110 may provide a consolidated purchase process for some online retailers in the selected purchase, and provide instructions for purchase at the online instructions for online retailers that do not accept purchases through the bag management system 110.

As apparent from the description above, the expanded product page and bag improves shopping on electronic devices. Shoppers can compare items, see beautiful brand images, video, or other product representations, and edit product specific details in a faster and more appealing way. The online shopping experience becomes easier, more fluid, and more fun. In some embodiments, shoppers who prefer the current shopping experience at an online retailer may continue to use it without loss of speed or screen area. The collection of products in a bag can be external to the existing checkout and can work without replacing the existing checkout at an online retailer, so the impact on existing e-commerce sites can be minimal. When multiple websites are equipped to refer to the bag management system, customers may shop from any of these websites, edit their choices from all sites, and then make a final purchase decision that moves them to the appropriate purchase flow at each online retailer. In another embodiment, the user may make the final purchase through the bag management system, with the bag management system completing the order with each online retailer.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
    displaying, on a computing device, a window including a retailer page that displays a set of available products from an online retailer and a transition area that is displayed alongside the retailer page in the window;
    receiving a selection of a product from the retailer page, wherein the selection comprises a movement of the product to the transition area;
    responsive to receiving the selection, requesting expanded details of the selected product from the bag management system;
    receiving the expanded details of the expanded product from the bag management system; and
    modifying the window to present the retailer page and an expanded product page in the window, the expanded product page including the expanded details of the selected product.

2. The method of claim 1, wherein the bag management system is a separate system from the online retailer.

3. The method of claim 1, wherein the expanded product page is a supplemental area in a window viewable with the retailer page.

4. The method of claim 1, wherein the expanded products page provides an overlay of the retailer page.

5. The method of claim 1, wherein the expanded product page displays the product based on a template selected by the online retailer.

6. The method of claim 1, further comprising:
    receiving an addition of the product to a bag, wherein the bag of products includes a plurality of products from the online retailer, each product of the plurality of products is displayed with the bag of products based on a primary image associated with the product.

7. The method of claim 1, further comprising:
    receiving an addition of the product to a bag, wherein the bag of products includes products from a plurality of online retailers including the online retailer.

8. The method of claim 7, further comprising:
    receiving instructions for purchasing products from the plurality of online retailers; and
    providing a purchase flow to each online retailer of the plurality of online retailers, each purchase flow comprising:
        providing instructions for the online retailer to initiate a purchase at the online retailer with the computing device, the purchase being of a subset of the products of the bag of products, the subset including products associated with the online retailer.

9. The method of claim 7, further comprising:
    receiving instructions for purchasing products from the plurality of online retailers;
    providing a purchase flow to the bag management system separate from the plurality of online retailers, the bag management system providing purchase of the bag of products from the plurality of online retailers.

10. A computer program product comprising a non-transitory computer-readable storage medium containing computer program code for:
    displaying, on a computing device, a window including a retailer page that displays a set of available products from an online retailer and a transition area that is displayed alongside the retailer page in the window;
    receiving a selection of a product from the retailer page, wherein the selection comprises a movement of the product to the transition area;
    responsive to receiving the selection, requesting expanded details of the selected product from the bag management system;
    receiving the expanded details of the expanded product from the bag management system; and
    modifying the window to present the retailer page and an expanded product page in the window, the expanded product page including the expanded details of the selected product.

11. The computer program product of claim 10, wherein the bag management system is a separate system from the online retailer.

12. The computer program product of claim 10, wherein the expanded product page is a supplemental area in a window viewable with the retailer page.

13. The computer program product of claim 10, wherein the expanded products page provides an overlay of the retailer page.

14. The computer program product of claim 10, wherein the expanded product page displays the product based on a template selected by the online retailer.

15. The computer program product of claim 10, further comprising program code for:
   receiving an addition of the product to a bag, wherein the bag of products includes a plurality of products from the online retailer, each product of the plurality of products is displayed with the bag of products based on a primary image associated with the product.

16. The computer program product of claim 10, further comprising program code for:
   receiving an addition of the product to a bag, wherein the bag of products includes products from a plurality of online retailers including the online retailer.

17. The computer program product of claim 16, further comprising program code for:
   receiving instructions for purchasing products from the plurality of online retailers; and
   providing a purchase flow to each online retailer of the plurality of online retailers, each purchase flow comprising:
      providing instructions for the online retailer to initiate a purchase at the online retailer with the computing device, the purchase being of a subset of the products of the bag of products, the subset including products associated with the online retailer.

18. The computer program product of claim 16, further comprising program code for:
   receiving instructions for purchasing products from the plurality of online retailers;
   providing a purchase flow to the bag management system separate from the plurality of online retailers, the bag management system providing purchase of the bag of products from the plurality of online retailers.

* * * * *